US011705585B2

(12) United States Patent
Ha et al.

(10) Patent No.: US 11,705,585 B2
(45) Date of Patent: Jul. 18, 2023

(54) RECHARGEABLE LITHIUM BATTERY

(71) Applicant: SAMSUNG SDI CO., LTD., Yongin-si (KR)

(72) Inventors: Jaehwan Ha, Yongin-si (KR); Kijun Kim, Yongin-si (KR); Heeeun Yoo, Yongin-si (KR); Yeonhee Yoon, Yongin-si (KR); Kyuseo Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 16/460,779

(22) Filed: Jul. 2, 2019

(65) Prior Publication Data

US 2020/0014027 A1 Jan. 9, 2020

(30) Foreign Application Priority Data

Jul. 3, 2018 (KR) .................. 10-2018-0077138

(51) Int. Cl.
*H01M 10/42* (2006.01)
*H01M 4/525* (2010.01)
(Continued)

(52) U.S. Cl.
CPC ......... *H01M 10/4235* (2013.01); *H01M 4/13* (2013.01); *H01M 4/525* (2013.01);
(Continued)

(58) Field of Classification Search
None
See application file for complete search history.

(56) References Cited

U.S. PATENT DOCUMENTS 5,582,931 A 12/1996 Kawakami
6,391,495 B1 5/2002 Choi et al.
(Continued)

FOREIGN PATENT DOCUMENTS

CN 1246736 A 3/2000
CN 1286507 A 3/2001
(Continued)

OTHER PUBLICATIONS

Machine Translation of JP 2018-106879 A (Year: 2018).*
(Continued)

*Primary Examiner* — Robert S Carrico
(74) *Attorney, Agent, or Firm* — Lewis Roca Rothgerber Christie LLP

(57) ABSTRACT

Disclosed is a rechargeable lithium battery including a positive electrode including a positive active material layer; and a negative electrode including a negative active material layer and a negative functional layer on the negative active material layer, wherein the functional layer includes flake-shaped polyethylene particles, and the positive active material layer includes a first positive active material including one or more composite oxides of lithium and a metal selected from cobalt, manganese, nickel, and a combination thereof, and a second positive active material including a compound represented by Chemical Formula 1 and. In Chemical Formula 1, 0.90≤a≤1.8, 0≤x≤0.7, and M is Mg, Co, Ni, or a combination thereof.

$Li_aFe_{1-x}M_xPO_4$ [Chemical Formula 1]

13 Claims, 9 Drawing Sheets

(51) Int. Cl.
*H01M 10/052* (2010.01)
*H01M 4/13* (2010.01)
*H01M 4/62* (2006.01)
*H01M 50/46* (2021.01)
*H01M 4/02* (2006.01)

(52) U.S. Cl.
CPC ......... *H01M 4/622* (2013.01); *H01M 10/052* (2013.01); *H01M 50/46* (2021.01); *H01M 2004/021* (2013.01); *H01M 2004/028* (2013.01)

(56) References Cited

U.S. PATENT DOCUMENTS

| | | |
|---|---|---|
| 6,465,125 B1 | 10/2002 | Takami et al. |
| 6,475,678 B1 | 11/2002 | Suzuki |
| 6,511,517 B1 | 1/2003 | Ullrich et al. |
| 6,511,776 B1 | 1/2003 | Ohshita et al. |
| 10,476,082 B2 | 11/2019 | Jang et al. |
| 10,756,352 B2 | 8/2020 | Yoon et al. |
| 2001/0041289 A1 | 11/2001 | Hikmet et al. |
| 2002/0004169 A1 | 1/2002 | Yamada et al. |
| 2005/0079422 A1 | 4/2005 | Ko et al. |
| 2005/0221165 A1 | 10/2005 | Hennige et al. |
| 2005/0287442 A1 | 12/2005 | Kim et al. |
| 2006/0099495 A1 | 5/2006 | Suzuki et al. |
| 2006/0257745 A1 | 11/2006 | Choi et al. |
| 2007/0057228 A1 | 3/2007 | Huang et al. |
| 2007/0264577 A1 | 11/2007 | Katayama et al. |
| 2008/0241684 A1 | 10/2008 | Muraoka et al. |
| 2008/0292965 A1 | 11/2008 | Kubota et al. |
| 2009/0067119 A1 | 3/2009 | Katayama et al. |
| 2009/0253043 A1 | 10/2009 | Bak |
| 2010/0248026 A1* | 9/2010 | Hinoki .............. H01M 4/62 429/209 |
| 2010/0266905 A1 | 10/2010 | Jeon et al. |
| 2011/0003209 A1 | 1/2011 | Katayama et al. |
| 2011/0062378 A1 | 3/2011 | Chang et al. |
| 2012/0321948 A1 | 12/2012 | Oya et al. |
| 2013/0011747 A1 | 1/2013 | Sasaki et al. |
| 2013/0089794 A1 | 4/2013 | Kim |
| 2013/0236790 A1 | 9/2013 | Byun |
| 2013/0288093 A1 | 10/2013 | Nakagiri et al. |
| 2013/0335030 A1 | 12/2013 | Joe et al. |
| 2013/0337301 A1 | 12/2013 | Joe et al. |
| 2013/0346000 A1 | 12/2013 | Joe et al. |
| 2014/0014027 A1 | 1/2014 | Bischoff et al. |
| 2014/0138591 A1 | 5/2014 | Yoon et al. |
| 2014/0272489 A1 | 9/2014 | Anandan et al. |
| 2014/0322600 A1 | 10/2014 | Morita et al. |
| 2015/0050533 A1 | 2/2015 | Nam et al. |
| 2015/0221452 A1* | 8/2015 | Iida .............. H01G 11/04 429/217 |
| 2016/0104880 A1* | 4/2016 | Gao .............. H01M 4/505 429/217 |
| 2016/0141579 A1 | 5/2016 | Seok et al. |
| 2016/0268558 A1 | 9/2016 | Sawayama |
| 2016/0285101 A1 | 9/2016 | Yoshio et al. |
| 2016/0322636 A1 | 11/2016 | Lee et al. |
| 2016/0351885 A1 | 12/2016 | Umehara |
| 2017/0170481 A1 | 6/2017 | Jang et al. |
| 2017/0187022 A1 | 6/2017 | Isozaki et al. |
| 2017/0229731 A1 | 8/2017 | Visco et al. |
| 2017/0288257 A1 | 10/2017 | Kil et al. |
| 2018/0040899 A1 | 2/2018 | Kuzuoka et al. |
| 2018/0083312 A1 | 3/2018 | Shiu et al. |
| 2018/0097218 A1 | 4/2018 | Komura |
| 2018/0145333 A1 | 5/2018 | Tokune et al. |
| 2018/0191677 A1 | 7/2018 | Ohara et al. |
| 2018/0205115 A1 | 7/2018 | Haba et al. |
| 2018/0294516 A1 | 10/2018 | Huang et al. |
| 2018/0331342 A1 | 11/2018 | Honda et al. |
| 2018/0375158 A1 | 12/2018 | Morinaka et al. |
| 2019/0123352 A1 | 4/2019 | Ko et al. |
| 2019/0123356 A1 | 4/2019 | Ko et al. |
| 2019/0140283 A1 | 5/2019 | Fukatani et al. |
| 2019/0229325 A1 | 7/2019 | Ahn et al. |
| 2019/0334157 A1 | 10/2019 | Seok et al. |
| 2019/0355952 A1 | 11/2019 | Yoon et al. |
| 2019/0383465 A1 | 12/2019 | Van Der Sijde et al. |
| 2020/0014027 A1 | 1/2020 | Ha et al. |
| 2020/0014078 A1 | 1/2020 | Ha et al. |
| 2020/0075955 A1 | 3/2020 | Jeon et al. |
| 2020/0127257 A1 | 4/2020 | Lee et al. |
| 2020/0350557 A1 | 11/2020 | Ha et al. |
| 2020/0350566 A1 | 11/2020 | Ha et al. |
| 2020/0350567 A1 | 11/2020 | Ha et al. |
| 2020/0350568 A1 | 11/2020 | Lee et al. |
| 2020/0350574 A1 | 11/2020 | Ha et al. |
| 2020/0350632 A1 | 11/2020 | Ha et al. |
| 2021/0074967 A1 | 3/2021 | Kim et al. |
| 2021/0074971 A1 | 3/2021 | Kim et al. |
| 2021/0074972 A1 | 3/2021 | Kim et al. |
| 2021/0074975 A1 | 3/2021 | Kwak et al. |
| 2021/0074979 A1 | 3/2021 | Kwak et al. |
| 2021/0074980 A1 | 3/2021 | Kim et al. |

FOREIGN PATENT DOCUMENTS

| | | |
|---|---|---|
| CN | 1838468 A | 9/2006 |
| CN | 101048892 A | 10/2007 |
| CN | 101783417 A | 7/2010 |
| CN | 101847709 A | 9/2010 |
| CN | 101478042 B | 12/2010 |
| CN | 102280614 A | 12/2011 |
| CN | 103947032 A | 7/2014 |
| CN | 104393267 A | 3/2015 |
| CN | 104466186 A | 3/2015 |
| CN | 104779377 A | 7/2015 |
| CN | 104916811 A | 9/2015 |
| CN | 105977447 A | 9/2016 |
| CN | 106848383 A | 6/2017 |
| CN | 111883815 A | 11/2020 |
| CN | 111883816 A | 11/2020 |
| CN | 111883819 A | 11/2020 |
| EP | 1079455 A2 | 2/2001 |
| EP | 1826842 A1 | 8/2007 |
| EP | 2581977 A1 | 4/2013 |
| EP | 2838142 A1 | 2/2015 |
| EP | 2874215 A1 | 5/2015 |
| EP | 3024063 A1 | 5/2016 |
| EP | 3386003 A1 | 10/2018 |
| JP | 2000-277148 A | 10/2000 |
| JP | 2001-135359 A | 5/2001 |
| JP | 2004-111157 A | 4/2004 |
| JP | 2005-123185 A | 5/2005 |
| JP | 2008-305783 A | 12/2008 |
| JP | 4977079 B2 | 7/2012 |
| JP | 2012-221672 A | 11/2012 |
| JP | 5110670 B2 | 12/2012 |
| JP | 5213305 B2 | 6/2013 |
| JP | 2015-115168 A | 6/2015 |
| JP | 6197384 B2 | 9/2017 |
| JP | 6271709 B2 | 1/2018 |
| JP | 2018-106879 A | 7/2018 |
| JP | 2018106879 A * | 7/2018 |
| JP | 2018-147672 A | 9/2018 |
| JP | 2018-156854 A | 10/2018 |
| JP | 2018-156876 A | 10/2018 |
| JP | 2019-087464 A | 6/2019 |
| KR | 10-2000-0056339 A | 9/2000 |
| KR | 10-2005-0035074 A | 4/2005 |
| KR | 10-2005-0035281 A | 4/2005 |
| KR | 10-2005-0121172 A | 12/2005 |
| KR | 10-2008-0073371 A | 8/2008 |
| KR | 10-2009-0106841 A | 10/2009 |
| KR | 10-2010-0081950 A | 7/2010 |
| KR | 10-1205375 B1 | 11/2012 |
| KR | 10-2013-0104088 A | 9/2013 |
| KR | 10-2013-0105449 A | 9/2013 |
| KR | 10-2013-0116170 A | 10/2013 |
| KR | 10-2014-0068893 A | 6/2014 |
| KR | 10-2015-0020022 A | 2/2015 |

(56) References Cited

FOREIGN PATENT DOCUMENTS

| | | |
|---|---|---|
| KR | 10-2015-0050974 A | 5/2015 |
| KR | 10-2015-0129181 A | 11/2015 |
| KR | 10-2015-0143334 A | 12/2015 |
| KR | 10-2016-0024776 A | 3/2016 |
| KR | 10-2016-0025052 A | 3/2016 |
| KR | 10-2016-0029176 A | 3/2016 |
| KR | 10-2016-0066518 A | 6/2016 |
| KR | 10-2016-0110076 A | 9/2016 |
| KR | 10-2016-0117689 A | 10/2016 |
| KR | 10-2017-0060515 A | 6/2017 |
| KR | 10-2017-0094720 A | 8/2017 |
| KR | 10-2017-0109285 A | 9/2017 |
| KR | 10-2017-0113645 A | 10/2017 |
| KR | 10-2018-0014192 A | 2/2018 |
| KR | 10-2018-0037121 A | 4/2018 |
| KR | 10-2018-0038831 A | 4/2018 |
| KR | 10-2018-0045724 A | 5/2018 |
| KR | 10-2018-0049986 A | 5/2018 |
| KR | 10-2018-0077190 A | 7/2018 |
| KR | 10-2018-0081072 A | 7/2018 |
| KR | 10-1876826 B1 | 7/2018 |
| KR | 10-2018-0097036 A | 8/2018 |
| KR | 10-2019-0043955 A | 4/2019 |
| KR | 10-2019-0043957 A | 4/2019 |
| KR | 10-2020-0004099 A | 1/2020 |
| KR | 10-2020-0044579 A | 4/2020 |
| WO | 2006/132474 A1 | 12/2006 |
| WO | WO 2011/115247 A1 | 9/2011 |
| WO | WO 2014-103792 A1 | 7/2014 |
| WO | WO 2018/012821 A1 | 1/2018 |

OTHER PUBLICATIONS

U.S. Office Action dated Mar. 4, 2021, issued in U.S. Appl. No. 16/460,765 (7 pages).
EPO Extended Search Report dated Nov. 7, 2019, for corresponding European Patent Application No. 19183919.0, (7 pages).
EPO Extended Search Report dated Nov. 7, 2019, corresponding to European Patent Application No. 19183958.8, (7 pages).
EPO Extended European Search Report dated Aug. 3, 2020, issued in European Patent Application No. 20171450.8 (8 pages).
EPO Extended European Search Report dated Aug. 3, 2020, issued in European Patent Application No. 20171551.3 (8 pages).
EPO Extended European Search Report dated Aug. 3, 2020, issued in European Patent Application No. 20171833.5 (8 pages).
EPO Extended European Search Report dated Aug. 3, 2020, issued in European Patent Application No. 20171846.7 (8 pages).
EPO Extended European Search Report dated Aug. 3, 2020, issued in European Patent Application No. 20171859.0 (9 pages).
EPO Extended European Search Report dated Aug. 3, 2020, issued in European Patent Application No. 20172132.1 (8 pages).
EPO Extended European Search Report dated Oct. 19, 2020, issued in European Patent Application No. 20172161.0 (5 pages).
U.S. Final Office Action dated Sep. 10, 2021, issued in U.S. Appl. No. 16/460,765 (7 pages).
U.S. Final Office Action dated Sep. 10, 2021, issued in U.S. Appl. No. 16/711,114 (10 pages).
Korean Notice of Allowance, with English translation, dated Sep. 2, 2021, issued in Korean Patent Application No. 10-2018-0160080 (10 pages).
Korean Notice of Allowance dated Mar. 25, 2021, issued in corresponding Korean Patent Application No. 10-2018-0077139 (5 pages).
Korean Notice of Allowance dated Mar. 25, 2021, issued in Korean Patent Application No. 10-2018-0077138 (5 pages).
Korean Office Action dated Mar. 11, 2021, issued in Korean Patent Application No. 10-2018-0160080 (8 pages).
EPO Office Action dated Nov. 29, 2021, issued in corresponding European Patent Application No. 19183919.0 (6 pages).
U.S. Final Office Action dated Dec. 15, 2021, issued in U.S. Appl. No. 16/711,114 (11 pages).
Chinese Office Action, with English translation, dated Jan. 26, 2022, issued in Chinese Patent Application No. 201910595050.1 (12 pages).
U.S. Advisory Action dated Nov. 17, 2021, issued in U.S. Appl. No. 16/460,765 (4 pages).
Office action from USPTO for U.S. Appl. No. 16/862,779, dated Feb. 17, 2022, 91 pages.
Chinese Office action for Application No. 201910594666.7, dated Feb. 9, 2022, 12 pages.
U.S. Notice of Allowance from U.S. Appl. No. 16/711,114, dated Mar. 2, 2022, 5 pages.
U.S. Office Action from U.S. Appl. No. 16/460,765, dated Feb. 16, 2022, 7 pages.
U.S. Office Action from U.S. Appl. No. 16/460,765, dated Feb. 28, 2022, 8 pages.
U.S. Office Action from U.S. Appl. No. 16/862,638, dated Apr. 27, 2022, 12 pages.
U.S. Office Action from U.S. Appl. No. 16/862,866, dated May 12, 2022, 43 pages.
U.S. Office Action from U.S. Appl. No. 16/864,294, dated May 3, 2022, 22 pages.
Office Action dated Mar. 28, 2022, of cross-reference U.S. Appl. No. 16/863,679.
Office Action dated Apr. 1, 2022, of cross-reference U.S. Appl. No. 16/864,384.
Final Office Action for U.S. Appl. No. 16/862,779 dated Jun. 7, 2022, 70 pages.
Office Action for U.S. Appl. No. 16/864,858 dated Jun. 28, 2022, 118 pages.
Wang, Jing, et al., "Thermal Synergy Effect between LiNi0.5Co0.2Mn0.3O2 and LiMn2O4 Enhances the Safety of Blended Cathode for Lithium Ion Batteries," ACS Applied Materials & Interfaces, 2016, 8, pp. 20147-20156.
Korean Notice of Allowance dated Jul. 11, 2022, issued in Korean Patent Application No. 10-2019-0052572 (2 pages).
Korean Notice of Allowance dated Jul. 11, 2022, issued in Korean Patent Application No. 10-2019-0052574 (2 pages).
Korean Office Action dated Jul. 13, 2022, issued in Korean Patent Application No. 10-2019-0052571 (12 pages).
Korean Notice of Allowance dated Jul. 13, 2022, issued in Korean Patent Application No. 10-2019-0052570 (2 pages).
Korean Office Action dated Jul. 13, 2022, issued in Korean Patent Application No. 10-2019-0052573 (10 pages).
European Office Action dated Jul. 22, 2022, issued in European Patent Application No. 20172161.0 (3 pages).
U.S. Notice of Allowance dated Jul. 20, 2022, issued in U.S. Appl. No. 16/863,679 (30 pages).
Chinese Office Action, with English translation, dated Aug. 23, 2022, issued in Chinese Patent Application No. 201911266005.8 (10 pages).
U.S. Notice of Allowance dated Aug. 1, 2022, issued in U.S. Appl. No. 16/864,384 (35 pages).
U.S. Notice of Allowance dated Aug. 8, 2022, issued in U.S. Appl. No. 16/862,638 (25 pages).
U.S. Notice of Allowance dated Aug. 15, 2022, issued in U.S. Appl. No. 16/862,779 (17 pages).
U.S. Final Office Action dated Aug. 30, 2022, issued in U.S. Appl. No. 16/864,294 (48 pages).
U.S. Final Office Action dated Sep. 23, 2022, issued in U.S. Appl. No. 16/460,765 (9 pages).
Korean Notice of Allowance dated Oct. 5, 2022, issued in Korean Patent Application No. 10-2019-0052569 (3 pages).
Korean Notice of Allowance dated Oct. 5, 2022, issued in Korean Patent Application No. 10-2019-0052568 (3 pages).
U.S. Notice of Allowance dated Sep. 28, 2022, issued in U.S. Appl. No. 16/862,866 (32 pages).
U.S. Notice of Allowance dated Oct. 13, 2022, issued in U.S. Appl. No. 16/864,858 (29 pages).
U.S. Office Action dated Dec. 22, 2022, issued in U.S. Appl. No. 16/460,765 (8 pages).
U.S. Advisory Action dated Dec. 5, 2022, issued in U.S. Appl. No. 16/864,294 (15 pages).

(56) References Cited

OTHER PUBLICATIONS

Chinese Office Action dated Dec. 5, 2022, issued in Chinese Patent Application No. 202010369783.6 (8 pages).
Korean Notice of Allowance dated Dec. 27, 2022, issued in Korean Patent Application No. 10-2019-0052573 (8 pages).
U.S. Notice of Allowance dated Jan. 25, 2023, issued in U.S. Appl. No. 16/862,866 (7 pages).
Notice of Allowance for U.S. Appl. No. 16/460,765 dated Mar. 29, 2023, 7 pages.

* cited by examiner

RECHARGEABLE LITHIUM BATTERY

CROSS-REFERENCE TO RELATED APPLICATION

This application claims priority to and the benefit of Korean Patent Application No. 10-2018-0077138 filed in the Korean Intellectual Property Office on Jul. 3, 2018, the entire content of which is incorporated herein by reference.

BACKGROUND

1. Field

Embodiments of this disclosure relate to a rechargeable lithium battery.

2. Description of the Related Art

A portable information device such as a cell phone, a laptop, smart phone, and the like, or an electric vehicle, has used a rechargeable lithium battery having high energy density and easy portability as a driving power source. In addition, research on use of a rechargeable lithium battery as a power source for a hybrid or electric vehicle, or as a power storage device, by using high energy density characteristics has been actively conducted.

One of the main research tasks of such a rechargeable lithium battery is to improve the safety of the rechargeable lithium battery. For example, if the rechargeable lithium battery is exothermic due to internal short circuit, overcharge and overdischarge, and/or the like, an electrolyte decomposition reaction and thermal runaway phenomenon may occur. As a result, an internal pressure inside the battery may rise rapidly to cause a battery explosion. Among these, when the internal short circuit of the rechargeable lithium battery occurs, there is a high risk of explosion because the large amount of electrical energy stored in the battery is conducted between the shorted positive electrode and negative electrode.

SUMMARY

Embodiments of the present disclosure are directed toward features capable of improving stability of a rechargeable lithium battery. A rechargeable lithium battery having improved stability is provided.

According to an embodiment, a rechargeable lithium battery includes a negative electrode including a negative current collector, a negative active material layer on the negative current collector, and a negative functional layer on the negative active material layer; and a positive electrode including a positive electrode current collector and a positive active material layer on the positive electrode current collector, wherein the negative functional layer includes flake-shaped polyethylene particles and the positive active material layer includes a first positive active material including one or more composite oxides of lithium and a metal selected from cobalt, manganese, nickel, and a combination thereof, and a second positive active material including a compound represented by Chemical Formula 1.

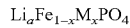 Chemical Formula 1

In Chemical Formula 1, 0.90≤a≤1.8, 0≤x≤0.7, and M is Mg, Co, Ni, or a combination thereof.

The flake-shaped polyethylene particles may have an average particle size (D50) of about 1 μm to about 8 μm.

The flake-shaped polyethylene particles may have a ratio of a major axis length to a minor axis length of about 1 to about 5.

The flake-shaped polyethylene particles may have a thickness of about 0.2 μm to about 4 μm.

The negative functional layer may further include inorganic particles and a binder.

A weight ratio of the sum of the flake-shaped polyethylene particles and the inorganic particles to the binder may be about 80:20 to about 99:1.

A weight ratio of the flake-shaped polyethylene particles to the inorganic particles may be about 95:5 to about 10:90.

The negative functional layer may have a thickness of about 1 μm to about 10 μm.

A ratio of a thickness of the negative active material layer to a thickness of the negative functional layer may be about 50:1 to about 10:1.

The first positive active material may be included in an amount of about 70 wt % to about 99 wt % based on a total weight of the positive active material layer.

The second positive active material may be included in an amount of about 1 wt % to about 15 wt % based on a total weight of the positive active material layer.

The positive electrode may further include a positive functional layer on the positive active material layer.

The first positive active material may be included in the positive active material layer and the second positive active material may be included in at least one selected from the positive active material layer and the positive functional layer.

The first positive active material may include one or more composite oxides of lithium and a metal selected from cobalt, manganese, nickel, and a combination thereof. The first positive active material may be selected from the group consisting of LiCoO$_2$, Li$_b$M$^1_{1-y}$1−z1M$^2_y$1M$^3_z$1O$_2$ (0.90≤b≤1.8, 0≤y1≤1, 0≤z1≤1, 0≤y1+z1≤1, M$^1$, M$^2$ and M$^3$ are each independently metal such as Ni, Co, Mn, Al, Sr, Mg or La), and combination thereof.

The second positive active material may include LiFePO$_4$.

As the reaction rate according to the temperature is improved, an early shutdown function may be realized and stability of the rechargeable lithium battery may be secured.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
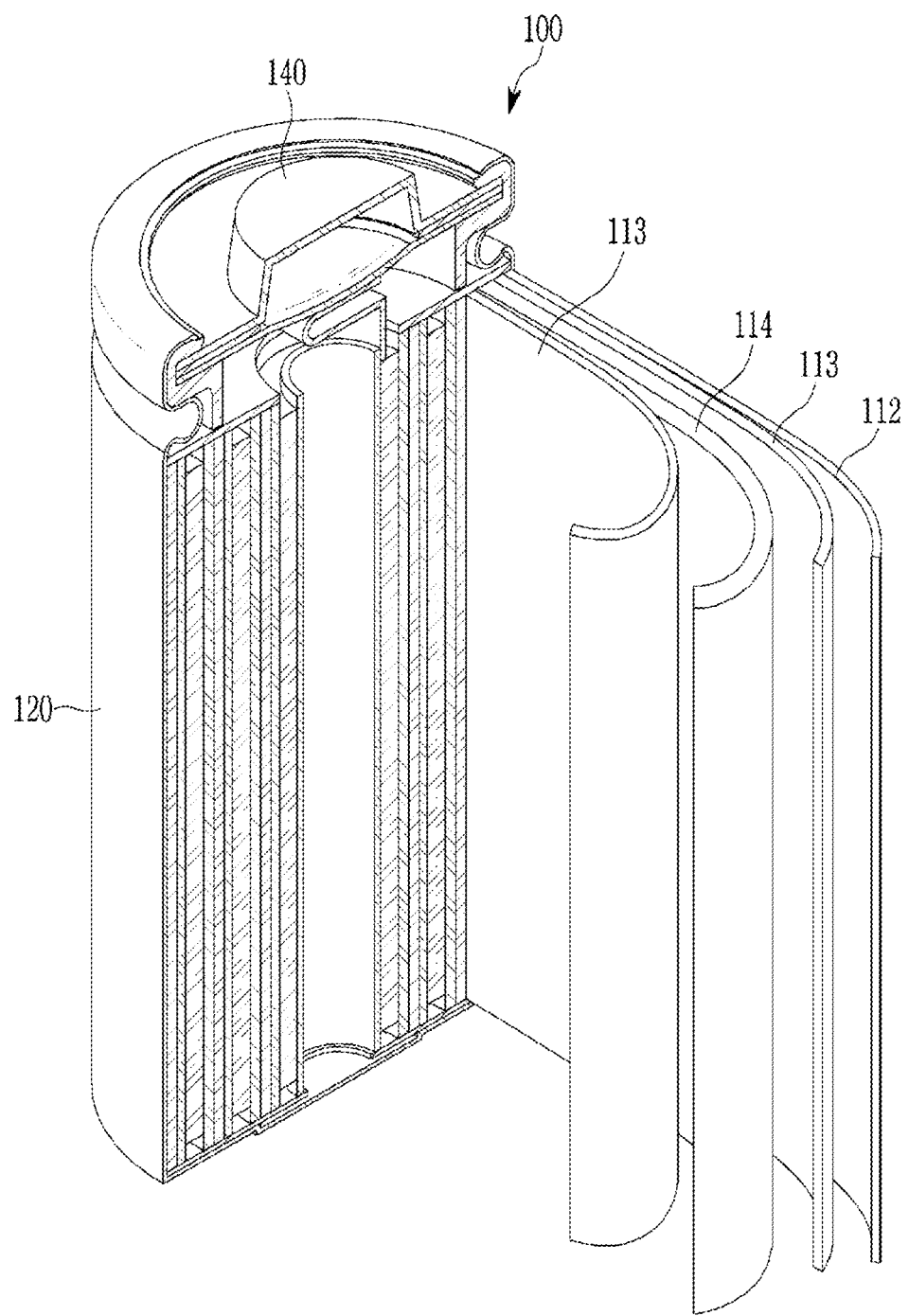
FIG. 1 is a schematic view of a structure of a rechargeable lithium battery according to an embodiment of the present disclosure.

Hereinafter, referring to the drawings, embodiments of the present disclosure are described in more detail. In the following description, functions or constructions not described may be any suitable ones generally used in the art.

In order to clearly illustrate and describe the subject matter of the present disclosure, the description and relationships of certain features may be omitted. Throughout the disclosure, the same or similar configuration elements are designated by the same reference numerals. Also, because the size and thickness of each configuration shown in the drawing may be arbitrarily shown for better understanding and ease of description, the present disclosure is not necessarily limited thereto.

A rechargeable lithium battery may be classified into a lithium ion battery, a lithium ion polymer battery, or a lithium polymer battery depending on kinds (or compositions) of a separator and an electrolyte. It also may be classified to as being cylindrical, prismatic, coin-type, pouch-type, or the like depending on the shape of the rechargeable lithium battery. In addition, the rechargeable lithium battery may be a bulk type (e.g., a bulk kind of battery) or a thin film type (e.g., a thin film kind of battery) depending on the size of the rechargeable lithium battery. Structures and manufacturing methods for lithium ion batteries pertaining to this disclosure may be any suitable ones generally used in the art.

Herein, as an example of a rechargeable lithium battery, a cylindrical rechargeable lithium battery is described, but the present disclosure is not limited thereto. FIG. 1 is a schematic view of the structure of a rechargeable lithium battery according to an embodiment. Referring to FIG. 1, a rechargeable lithium battery 100 according to an embodiment includes a battery cell including a negative electrode 112, a positive electrode 114 facing the negative electrode 112, a separator 113 interposed between the negative electrode 112 and the positive electrode 114, and an electrolyte for a rechargeable lithium battery impregnating the negative electrode 112, the positive electrode 114, and the separator 113. A battery case 120 houses the battery cell, and a sealing member 140 seals the battery case 120.

Hereinafter, a configuration of the rechargeable lithium battery 100 according to an embodiment of the present disclosure will be described in more detail.

A rechargeable lithium battery according to an embodiment of the present disclosure includes a negative electrode including a negative current collector, a negative active material layer on the negative current collector, and a negative functional layer on the negative active material layer; and a positive electrode including a positive electrode current collector and a positive active material layer on the positive electrode current collector. The negative functional layer includes flake-shaped polyethylene particles and the positive active material layer includes a first positive active material including: one or more composite oxides of lithium and a metal selected from cobalt, manganese, nickel, and a combination thereof, and a second positive active material including a compound represented by Chemical Formula 1.

The negative electrode of the rechargeable lithium battery according to an embodiment of the present disclosure may include the negative functional layer including the flake-shaped polyethylene particles.

In the case of the negative functional layer including the flake-shaped polyethylene particles, a reaction rate according to the temperature is increased under the same (or substantially the same) reaction conditions as compared with the case of including spherical-shaped polyethylene particles, and thus, a stability improvement effect of the rechargeable lithium battery may be further improved by including the flake-shaped polyethylene particles. For example, when the flake-shaped polyethylene particles are included, an area covering pores is thinner and wider, before melting, than is the case for the spherical-shaped polyethylene particles, before melting. If the polyethylene particles are melted at a temperature exceeding a set or certain temperature and ion channels are closed, an electrode plate area where the flake-shaped polyethylene particles are melted and closed is larger than an electrode plate area where the spherical-shaped polyethylene particles are melted and closed, and thus, the flake-shaped polyethylene particles may have a fast reaction rate as compared to the spherical-shaped polyethylene particles.

For example, during thermal runaway of a battery, the polyethylene particles included in the negative functional layer are melted and ion channels are closed, thereby limiting movement of ions through the ion channels and resulting in a shutdown function. Thus, additional electrical chemical reactions may be prevented or reduced by the shutdown function.

Figure 4:
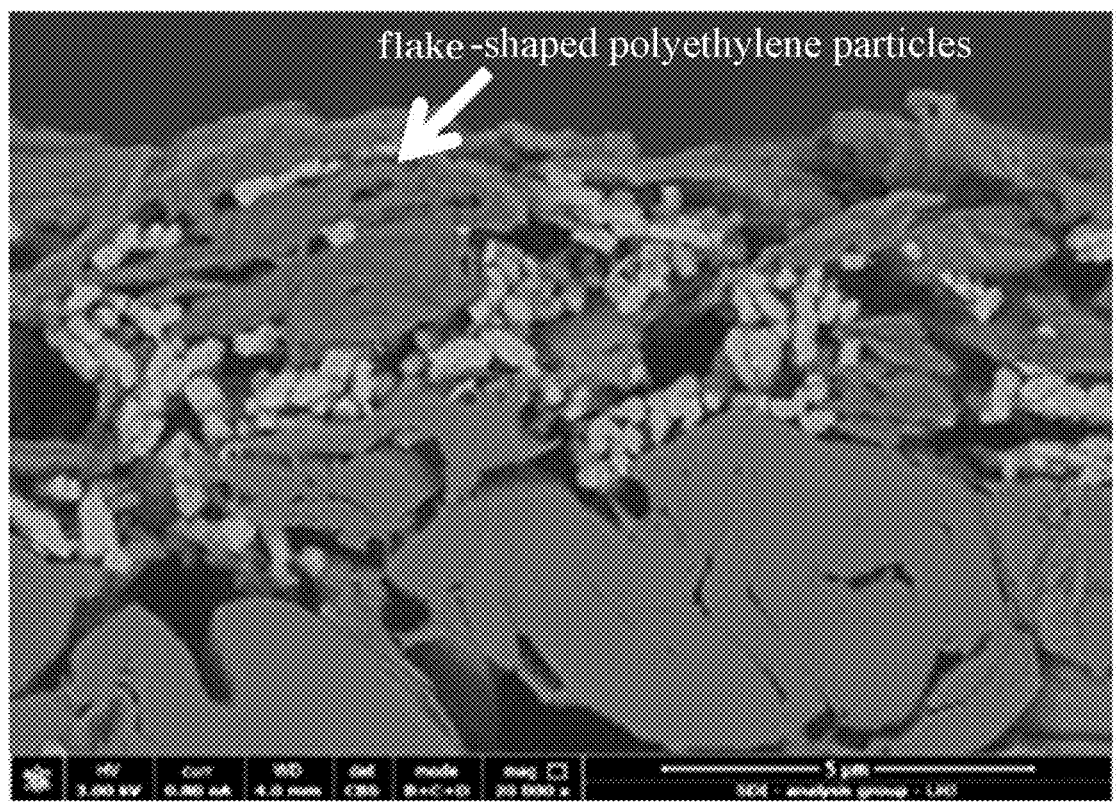
FIG. 4 is an SEM image of the negative functional layer according to an embodiment.

For example, as shown in FIG. 4, the flake-shaped polyethylene particles according to an embodiment have a thin and wide shape on pores in the negative functional layer composition, so the flake-shaped polyethylene particles are configured to be melted more rapidly (as compared to the spherical-shaped polyethylene particles) in the event of a thermal runaway (due to, for example, thermal/physical impacts to the rechargeable lithium battery) to suppress or reduce the availability and/or functional capabilities of the ion channels, and thereby suppress, reduce, or halt the thermal runaway.

In general, polyethylene may be classified, according to the density of the polyethylene, into a high density polyethylene (HDPE) having a density of about 0.94 g/cc to about 0.965 g/cc, a medium density polyethylene (MDPE) having a density of about 0.925 g/cc to about 0.94 g/cc, a low density polyethylene (LDPE) having a density of about 0.91 g/cc to about 0.925 g/cc), or a very low density polyethylene (VLDPE) having a density of about 0.85 g/cc to about 0.91 g/cc.

The flake-shaped polyethylene particles may include for example polyethylene polymers such as HDPE, MDPE, and/or LDPE alone or in a mixture of two or more.

The flake-shaped polyethylene particles included in the negative functional layer on the negative active material layer may have an average particle size (D50) of about 1 μm to about 8 μm, and, for example, about 2 μm to about 6 μm.

As used herein, when a definition is not otherwise provided, average particle size (D50) may be measured by any suitable method generally used in the art such as, for example, by utilizing a particle size analyzer, or transmission electron microscope (TEM) or scanning electron microscope (SEM) images (e.g., photographs). In some embodiments, a dynamic light-scattering measurement device may be used to perform a data analysis, and the number of particles may be counted for each particle size range. From this, the D50 value may be easily obtained through a calculation. For example, the D50 value may correspond to a particle size at which half of the mass (or volume) of the particles have a larger particle size and the other half of the mass (or volume) of the particles have a smaller particle size.

On the other hand, a ratio of a major axis length to a minor axis length of the flake-shaped polyethylene particles may be about 1 to about 5, and, for example, about 1.1 to about 4.5, or about 1.2 to about 3.5.

In addition, the flake-shaped polyethylene particles may have a thickness of about 0.2 μm to about 4 μm, and, for example, about 0.3 μm to about 2.5 μm, or about 0.3 μm to about 1.5 μm.

Figure 2:
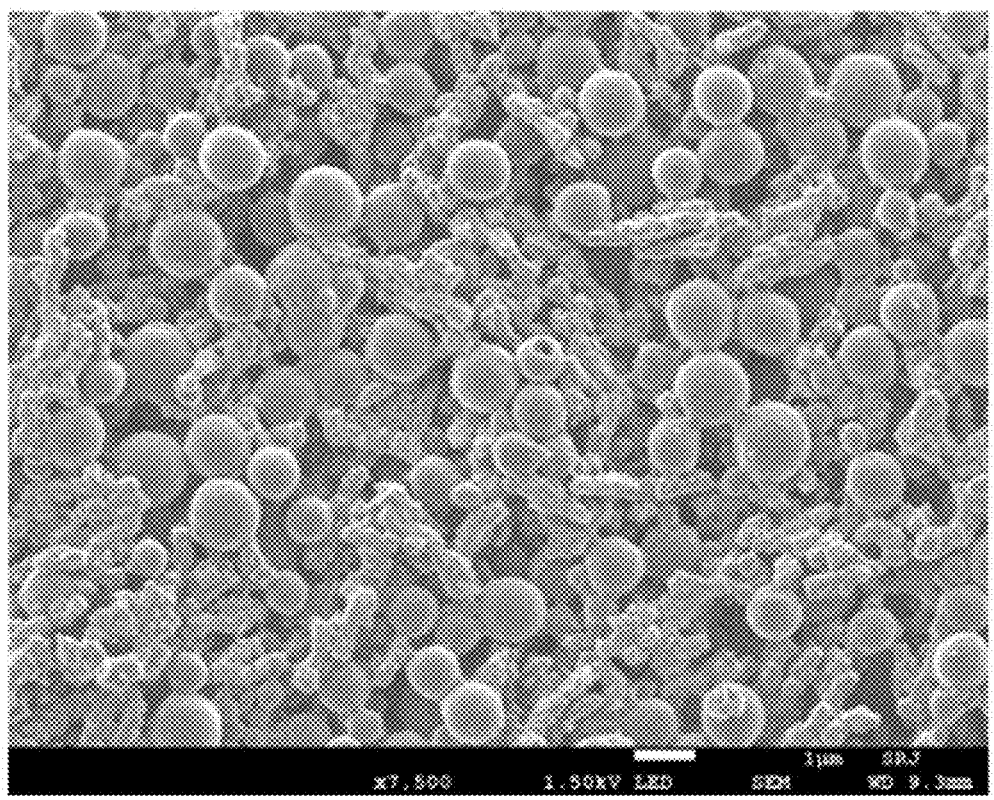
FIG. 2 is an SEM image of polyethylene spherical-shaped particles in a water dispersion state.
Figure 3:
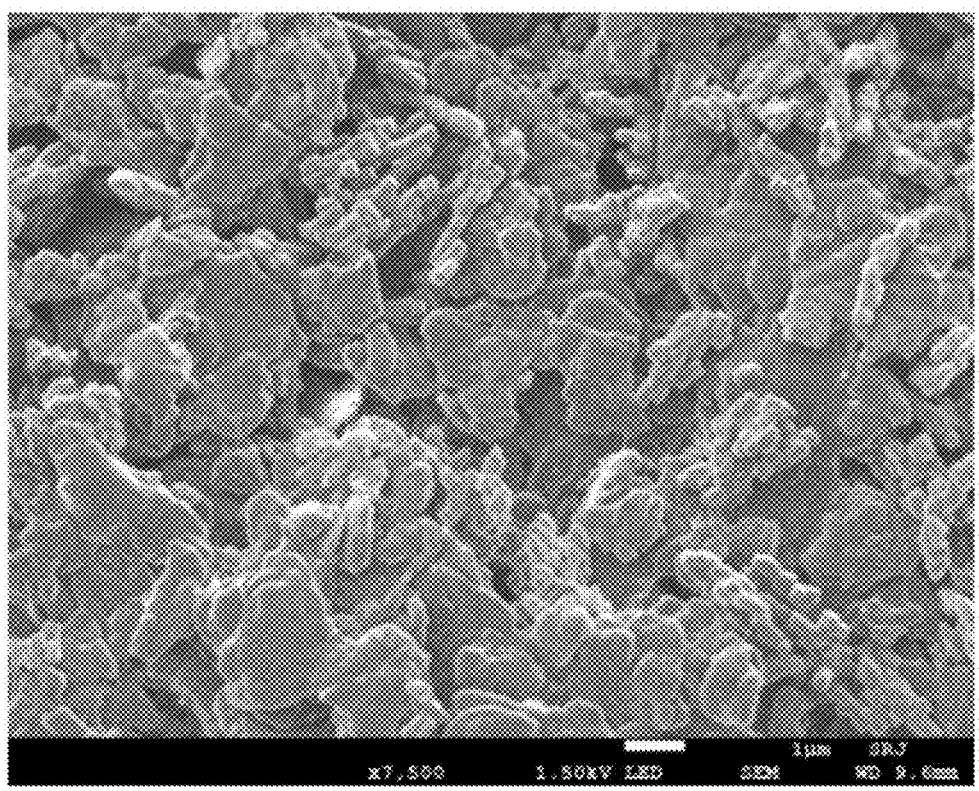
FIG. 3 is an SEM image of polyethylene particles according to an embodiment.

The polyethylene particles according to embodiments of the present disclosure have a flake-shape as shown in FIG. 3, and have a different shape from spherical-shaped polyethylene particles in a water dispersion state as shown in FIG. 2. An average particle size of the flake-shaped polyethylene particles may be defined to be D50.

When the flake-shaped polyethylene particles have a size and/or thickness within the ranges described herein, ion channels may be effectively closed in a small amount (e.g., may be effectively closed rapidly or in a small amount of time).

The negative functional layer may further include inorganic particles and a binder.

A weight ratio of the flake-shaped polyethylene particles and, optionally, the inorganic particles to the binder may be about 80:20 to about 99:1, and, for example, about 85:15 to about 97:3.

A weight ratio of the flake-shaped polyethylene particles to the inorganic particles may be about 95:5 to about 10:90, and, for example, about 30:70 to about 70:30.

When the amounts of the flake-shaped polyethylene particles and inorganic particles are within the ranges described herein, cycle-life characteristics and output characteristics of a rechargeable lithium battery including the same may be ensured or improved.

The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but the present disclosure is not limited thereto. Organic particles such as an acrylic compound, an imide compound, an amide compound, or a combination thereof may be further included in addition to the inorganic particles, but the present disclosure is not limited thereto.

The inorganic particles may be spherical, flake-shaped, cubic, or amorphous. The inorganic particles may have an average particle diameter (e.g., D50) of about 1 nm to about 2500 nm, for example, about 100 nm to about 2000 nm, about 200 nm to about 1000 nm, or about 300 nm to about 800 nm. The average particle diameter of the inorganic particles may be a particle size (D50) at 50% as a volume ratio (or mass ratio) in a cumulative particle size-distribution curve.

The negative functional layer may have a thickness of about 1 μm to about 10 μm, and, for example, about 3 μm to about 10 μm.

A ratio of a thickness of the negative active material layer to a thickness of the negative functional layer may be about 50:1 to about 10:1, and, for example, about 30:1 to about 10:1.

When the thickness of the negative functional layer is within the ranges described herein, the thermal stability of the resultant rechargeable lithium battery may be significantly improved while maintaining excellent cycle-life characteristics.

In some embodiments, when the ratio of the thickness of the negative active material layer to the thickness of the negative functional layer is included in the ranges described herein, thermal safety may be improved while minimizing or reducing energy density deterioration or reduction.

The negative electrode current collector may include one selected from a copper foil, a nickel foil, a stainless steel foil, a titanium foil, a nickel foam, a copper foam, a polymer substrate coated with a conductive metal, and a combination thereof.

The negative active material may include a material that reversibly intercalates/deintercalates lithium ions, a lithium metal, a lithium metal alloy, a material capable of doping/dedoping lithium, and/or transition metal oxide.

The material that reversibly intercalates/deintercalates lithium ions may include any suitable carbon material that is generally used in the art as a carbon-based negative active material in a rechargeable lithium battery. Examples of the carbon-based negative active material may be crystalline carbon, amorphous carbon, or a mixture thereof. The crystalline carbon may be non-shaped, sheet-shaped, flake-shaped, spherical-shaped, or fiber-shaped natural graphite or artificial graphite. The amorphous carbon may be a soft carbon, a hard carbon, a mesophase pitch carbonization product, fired coke, and/or the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a silicon-based material, for example, Si, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), a Sn-carbon composite, and/or the like. At least one of the foregoing materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include lithium titanium oxide.

In the negative active material layer, the negative active material may be included in an amount of about 95 wt % to about 99 wt % based on the total weight of the negative active material layer.

The negative active material layer may further include, optionally, a negative electrode conductive material and a negative electrode binder.

Each amount of the negative electrode conductive material and the negative electrode binder may be about 1 wt % to about 5 wt % based on a total weight of the negative active material layer.

The negative electrode conductive material is included to provide a negative electrode with conductivity (e.g., electrical conductivity). Any suitable, electronically conductive material may be used as a conductive material unless it causes a chemical change in a battery (e.g., an undesirable change to any of the components of the rechargeable lithium battery). Examples thereof may include a carbon-based material such as natural graphite, artificial graphite, carbon black, acetylene black, ketjen black, carbon fiber, and the like; a metal-based material of a metal powder or a metal fiber including copper, nickel, aluminum, silver, and the like; a conductive polymer such as a polyphenylene derivative; or a mixture thereof.

The negative electrode binder acts to adhere negative active material particles to each other and to adhere the negative active material to the current collector. The negative electrode binder may be a non-aqueous binder, an aqueous binder, an amphiphilic binder (aqueous/non-aqueous binder), or a combination thereof.

The non-aqueous binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth) acrylic acid alkyl ester, or a combination thereof.

The amphiphilic binder may be an acrylated styrene-based rubber, and/or the like.

When the negative electrode binder is an aqueous binder, a cellulose-based compound may be further used to provide viscosity as a thickener. The cellulose-based compound may include one or more of carboxylmethyl cellulose, hydroxypropylmethyl cellulose, methyl cellulose, or alkali metal salts thereof. The alkali metals may be Na, K, and/or Li. The thickener may be included in an amount of about 0.1 to about 3 parts by weight based on 100 parts by weight of the negative active material.

The positive electrode of the rechargeable lithium battery according to an embodiment of the present disclosure may include a positive active material layer including a first positive active material including one or more composite oxides of lithium and a metal selected from cobalt, manganese, nickel, and a combination thereof, and a second positive active material including a compound represented by Chemical Formula 1.

Figure 9:
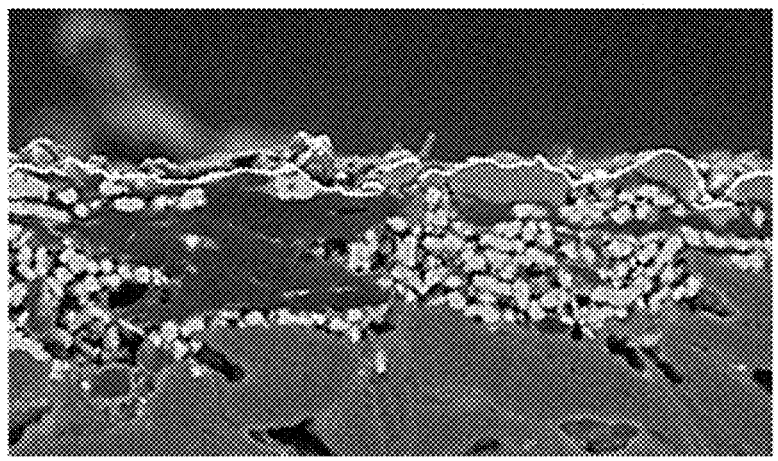
FIG. 9 is an SEM image showing a cross section of a negative electrode surface during shut-down of a rechargeable lithium battery cell that does not include a positive electrode according to an embodiment.
Figure 10:
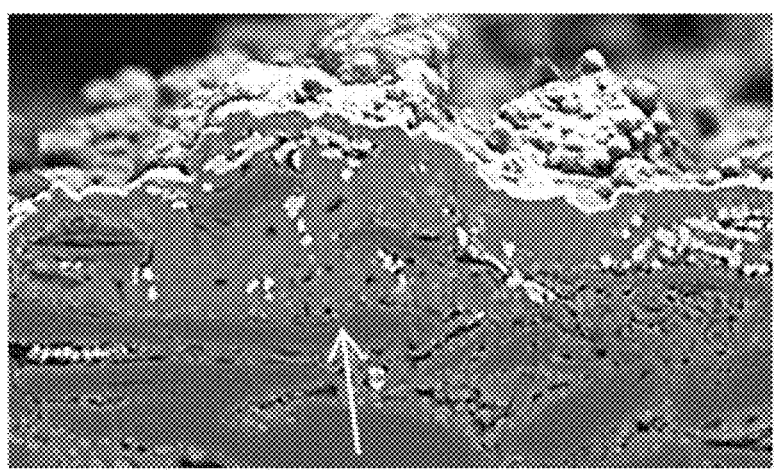
FIG. 10 is an SEM image showing a cross section of a negative electrode surface during shut-down of a rechargeable lithium battery cell that includes a negative electrode including a negative functional layer according to an embodiment and a positive electrode simultaneously.

The rechargeable lithium battery according to an embodiment of the present disclosure includes both of the negative functional layer on the negative electrode and a positive active material layer including the first positive active material and the second positive active material at the same time, so that a heat increase rate by thermal/physical impact may be decreased, and the flake-shaped polyethylene particles may be melted, thereby resulting in the ion channels effectively being closed. In a case of rechargeable battery in which the positive electrode according to an embodiment is not associated, the ion channels may be relatively insufficiently or unsuitably closed when increasing heat by thermal/physical impact (see, e.g., FIG. 9). On the other hand, in a case of a rechargeable battery including both of the positive electrode and the negative electrode including the negative functional layer according to an embodiment, the ion channels may be relatively completely closed when heat is increased by the thermal/physical impact, thereby ensuring safety of the rechargeable lithium battery may be maximized or increased (see, e.g., FIG. 10).

The positive electrode may further include a positive functional layer on the positive active material layer.

The first positive active material may be included in the positive active material layer and the second positive active material may be included in the at least one of the positive active material layer and the positive functional layer.

The first positive active material may include one or more composite oxides of lithium and a metal selected from cobalt, manganese, nickel, and a combination thereof. The first positive active material may be selected from the group consisting of $LiCoO_2$, $Li_bM^1_{1-y}1-z1M^2_y1M^3_z1O_2$ ($0.91 \leq b \leq 1.8$, $0 \leq y1 \leq 1$, $0 \leq z1 \leq 1$, $0 \leq y1+z1 \leq 1$, $M^1$, $M^2$ and $M^3$ are each independently metal such as Ni, Co, Mn, Al, Sr, Mg or La), and combination thereof.

Examples of the first positive active material may include a compound represented by one of the following chemical formulae.

$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $Li_aFePO_4$ ($0.90 \leq a \leq 1.8$).

In the foregoing chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The foregoing compounds may have a coating layer on the surface, or may be mixed with another compound having a coating layer. The coating layer may include at least one coating element compound selected from an oxide of the coating element, a hydroxide of the coating element, an oxyhydroxide of the coating element, an oxycarbonate of the coating element, and a hydroxy carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed utilizing a method having no adverse influence (or substantially no adverse influence) on properties of a positive active material by using these elements in the compound. For example, the method may include any suitable coating method (e.g., spray coating, dipping, etc.) generally used in the art.

The first positive active material may be included in an amount of about 70 wt % to about 99 wt %, and, for example, about 85 wt % to about 99 wt %, about 87 wt % to about 95 wt %, or about 90 wt % to about 98 wt % based on a total weight of the positive active material layer. When the amount of the first positive active material satisfies the ranges described herein, safety may be improved without deteriorating or reducing capacity.

The second positive active material may include for example LiFePO$_4$.

The second positive active material may be included in an amount of about 1 wt % to about 15 wt %, and, for example, about 2 wt % to about 15 wt %, about 2 wt % to about 12 wt %, or about 2 wt % to about 10 wt % based on a total weight of the positive active material layer. When the amount of the second positive active material satisfies the ranges described herein, safety may be improved without deteriorating or reducing capacity.

The positive electrode current collector may be aluminum or nickel, but the present disclosure is not limited thereto.

The positive active material layer may further include, optionally, a positive electrode conductive material and a positive electrode binder.

Each amount of the positive electrode conductive material and the positive electrode binder may be about 1 wt % to about 5 wt % based on a total weight of the positive active material layer.

The positive electrode conductive material is used to provide the positive electrode with conductivity (e.g., electrical conductivity). The positive electrode conductive material may be the same as described herein with respect to the negative electrode conductive material.

The positive electrode binder improves binding properties of positive active material particles with one another and with a current collector. Examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is the present disclosure not limited thereto.

The electrolyte includes a non-aqueous organic solvent and a lithium salt.

The non-aqueous organic solvent serves as a medium for transporting ions taking part in the electrochemical reaction of a battery.

The non-aqueous organic solvent may be a carbonate-based, ester-based, ether-based, ketone-based, alcohol-based, and/or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like, and the ester-based solvent may include methyl acetate, ethyl acetate, n-propyl acetate, dimethylacetate, methyl propionate, ethyl propionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like, and the ketone-based solvent may be cyclohexanone, and/or the like. The alcohol based solvent may include ethanol, isopropyl alcohol, and/or the like, and the aprotic solvent may include nitriles such as R—CN (wherein R is a C2 to C20 linear, branched, or cyclic hydrocarbon group, a double bond, an aromatic ring, or an ether bond), and/or the like, amides such as dimethyl formamide, and/or the like, dioxolanes such as 1,3-dioxolane, and/or the like, sulfolanes, and/or the like.

The non-aqueous organic solvent may be used alone or in a mixture. When the organic solvent is used in a mixture, the mixture ratio may be controlled in accordance with a desirable battery performance, and the mixture ratio may be any suitable ratio generally used in the art.

In addition, the carbonate-based solvent may include a mixture of a cyclic carbonate and a chain-type carbonate. In this case, when the cyclic carbonate and the chain-type carbonate are mixed together to a volume ratio of about 1:1 to about 1:9, performance of an electrolyte may be enhanced.

The non-aqueous organic solvent of the present disclosure may further include an aromatic hydrocarbon-based organic solvent in addition to the carbonate-based solvent. Herein, the carbonate-based solvent and the aromatic hydrocarbon-based organic solvent may be mixed to a volume ratio of about 1:1 to about 30:1.

The aromatic hydrocarbon-based organic solvent may be an aromatic hydrocarbon-based compound of Chemical Formula 2.

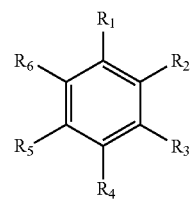

Chemical Formula 2

In Chemical Formula 2, $R_1$ to $R_6$ are the same or different and are selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include an additive of vinylene carbonate or an ethylene carbonate-based compound of Chemical Formula 3 in order to improve cycle-life of a battery.

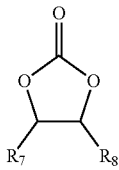

Chemical Formula 3

In Chemical Formula 3, $R_7$ and $R_8$ are the same or different and selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group and $R_7$ and $R_8$ are not simultaneously hydrogen.

Examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving cycle-life may be used within an appropriate or suitable range.

The lithium salt dissolved in an organic solvent supplies a battery with lithium ions, basically operates the rechargeable lithium battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, and $LiB(C_2O_4)_2$ (lithium bis(oxalato) borate; LiBOB). A concentration of the lithium salt may be in a range from about 0.1 M to about 2.0 M. When the lithium salt is included at the above concentration range, an electrolyte may have excellent performance and lithium ion mobility due to improved or optimal electrolyte conductivity and viscosity.

As described herein above, the separator 113 may be between the positive electrode 114 and the negative electrode 112. The separator 113 may be, for example, selected from a glass fiber, polyester, polyethylene, polypropylene, polytetrafluoroethylene, and a combination thereof. It may have a form of a non-woven fabric or a woven fabric. For example, in a rechargeable lithium battery, a polyolefin-based polymer separator such as polyethylene and polypropylene is mainly used. In order to ensure the heat resistance or mechanical strength, a coated separator including a ceramic component or a polymer material may be used. Optionally, it may have a mono-layered or multi-layered structure.

Hereinafter, the above aspects of embodiments of the present disclosure are illustrated in more detail with reference to examples. However, these examples are exemplary, and the present disclosure is not limited thereto.

Manufacture of Rechargeable Lithium Battery Cell

Example 1: Battery Cell Including Flake-shaped 2 μm PE Particles 95 wt % of a positive active material in which $LiCoO_2$/$LiFePO_4$ "LCO/LFP" were mixed to a weight ratio of 9:1, 3 wt % of a polyvinylidene fluoride binder, and 2 wt % of a ketjen black conductive material were mixed in a N-methyl pyrrolidone solvent to provide a positive active material slurry. The positive active material slurry was coated on both surfaces of an aluminum current collector, dried and compressed to provide a positive electrode formed with a positive active material layer.

98 wt % of graphite, 0.8 wt % of carboxylmethyl cellulose, and 1.2 wt % of styrene-butadiene rubber were mixed in pure water to provide a negative active material slurry. The negative active material slurry was coated on both surfaces of a copper current collector, dried, and compressed to provide a negative electrode formed with a negative active material layer.

48 wt % of flake-shaped polyethylene (PE) particles having an average particle size of 2 μm (major axis length/minor axis length ratio=about 2, thickness=about 0.6 μm), 47 wt % of alumina (average particle diameter (D50)=0.7 μm), and 5 wt % of an acrylated styrene-based rubber binder were mixed in an alcohol-based solvent to provide a PE/alumina slurry.

The PE/alumina slurry was coated on both surfaces of the negative electrode, dried, and compressed to provide a negative functional layer including flake-shaped PE particles.

The positive electrode, a separator including a PE/polypropylene (PP) multi-layer substrate, the negative electrode formed with the negative functional layer including the flake-shaped PE particles were sequentially stacked to provide an electrode assembly having a structure shown in FIG. 1, and then an electrolyte was injected to provide a rechargeable battery cell.

Example 2: Battery Cell Including Flake-shaped 4 μm PE Particles

A rechargeable battery cell was manufactured in accordance with substantially the same procedure as in Example 1, except that the negative electrode was prepared using flake-shaped PE particles having an average particle size of 4 μm (major axis length/minor axis length ratio=about 2.4, thickness=about 0.6 μm).

Example 3: Battery Cell Including Flake-shaped 6 μm PE Particles

A rechargeable battery cell was manufactured in accordance with substantially the same procedure as in Example 1, except that the negative electrode was prepared using flake-shaped PE particles having an average particle size of 6 μm (major axis length/minor axis length ratio=about 2.4, thickness=about 0.6 μm).

Comparative Example: Battery Cell Including Spherical-shaped PE Particles

A rechargeable battery cell was manufactured in accordance with substantially the same procedure as in Example 1, except that the negative electrode was prepared using a dispersion in which spherical-shaped PE particles having an average particle size of 4 μm were dispersed in an alcohol-based solvent instead of the flake-shaped PE particles having an average particle size of 2 μm.

Figure 5:
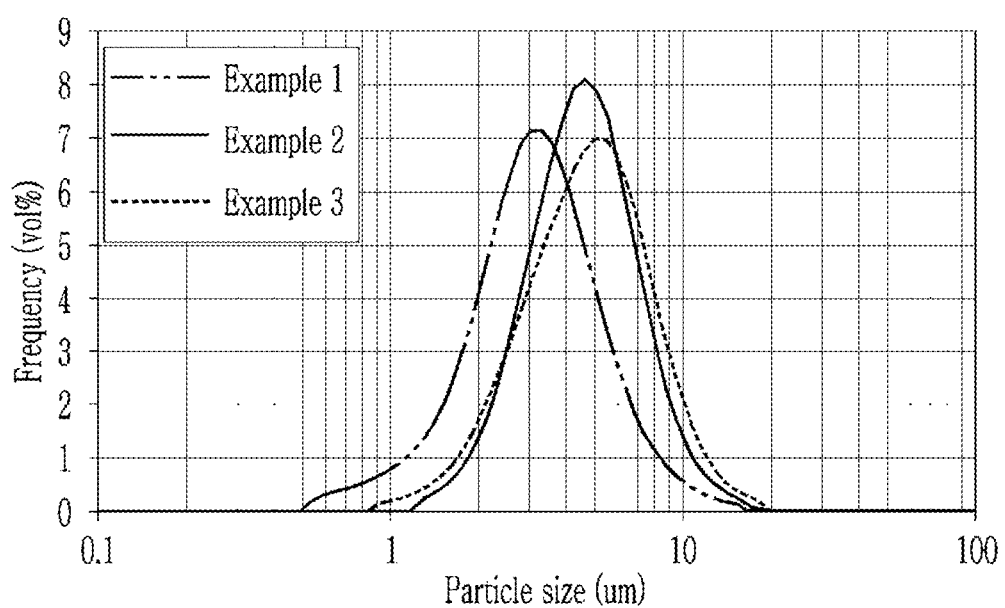
FIG. 5 is a graph showing particle size distributions of respective flake-shaped polyethylene particles included in the negative functional layer according to Examples 1 to 3.

The particle distributions of flake-shaped polyethylene particles included in the electrode compositions according to Examples 1 to 3 may be seen in FIG. 5.

Evaluation Examples

1. Evaluation of Resistance Increase Rate of Electrode Plate

Figure 8:
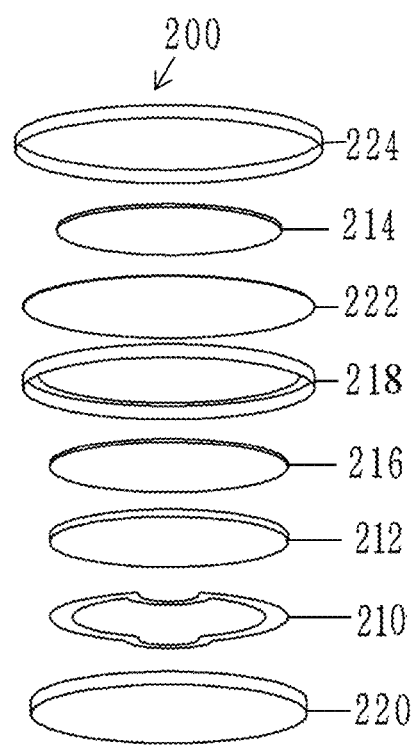
FIG. 8 is a schematic view of a coin symmetric cell manufactured to evaluate resistance increase rates of the electrode plates.

A negative electrode formed with a negative functional layer including flake-shaped PE particles according to Examples 1-3, a separator including a PE/PP multi-layer substrate, and a negative electrode formed with a negative functional layer including flake-shaped PE particles according to Example 1 were sequentially stacked, and an electrolyte including 1M LiBF$_4$ dissolved in propylene carbonate was injected thereto to provide a coin symmetric cell shown in FIG. 8.

FIG. 8 is a schematic view of a coin symmetric cell manufactured to evaluate resistance increase rates of the electrode plates. Referring to FIG. 8, a coin symmetric cell 200 (which may also be referred to as a symmetrical blocking electrode cell), includes a bottom case 220, a spring 210, a negative electrode 212, a first spacer 216, a separator 218, a second spacer 222, a positive electrode 214, and a top case 224, stacked in the stated order. The spring 210 included 3 springs, the negative electrode 212 had a diameter of 15.5 mm φ, the first spacer 216 and the second spacer 222 each had a thickness of 500 μm, and the separator 218 included a polyethylene (PE) separator having a diameter of 19 mm φ (612 HS). The coin symmetric cell 200 was impregnated with an electrolyte (EL) including 50 μL of 1M LiBF$_4$ in propylene carbonate (PC).

The obtained coin symmetric cell was introduced into a temperature changeable chamber after mounting a temperature sensor and a resistance measurer (a resistance meter) and evaluated. Changes in temperature and resistance of the coin symmetric cell were measured while increasing the temperature at a rate of 10° C./minute, and the results of evaluating the resistance increase rate of an electrode plate according to a temperature are shown in FIG. 6.

Figure 6:
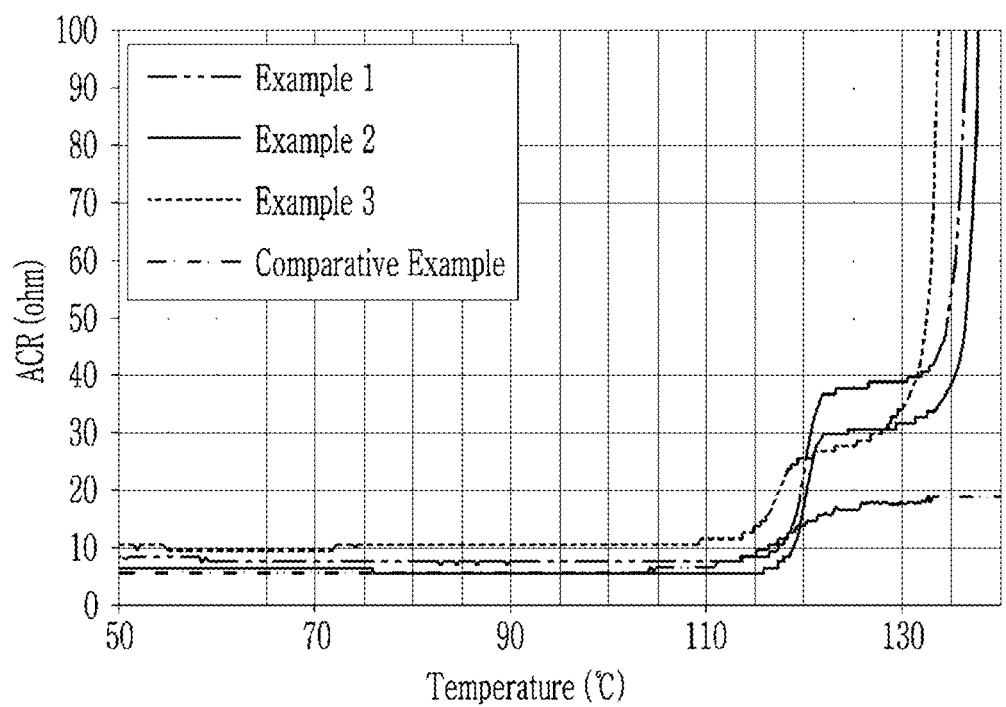
FIG. 6 is a graph showing resistance increase rates of the electrode plates of Examples 1 to 3 and the Comparative Example in accordance with temperature.

FIG. 6 is a graph showing resistance increase rates of the electrode plates in accordance with a temperature.

Referring to FIG. 6, it can be seen that the resistance increase rate of the electrode plate according to the Examples (e.g., Examples 1 to 3) was significantly higher than the Comparative Example at a high temperature of 120° C. or higher.

From this, it can be seen that in a case of a battery cell including the active material layer according to an embodiment, ion channels are effectively suppressed (or the availability and/or functionality of the ion channels may be reduced) during thermal runaway by the thermal/physical impact, so the shut-down function may be expressed or initiated at an early stage.

2. Evaluation of Cycle-life Characteristics

Figure 7:
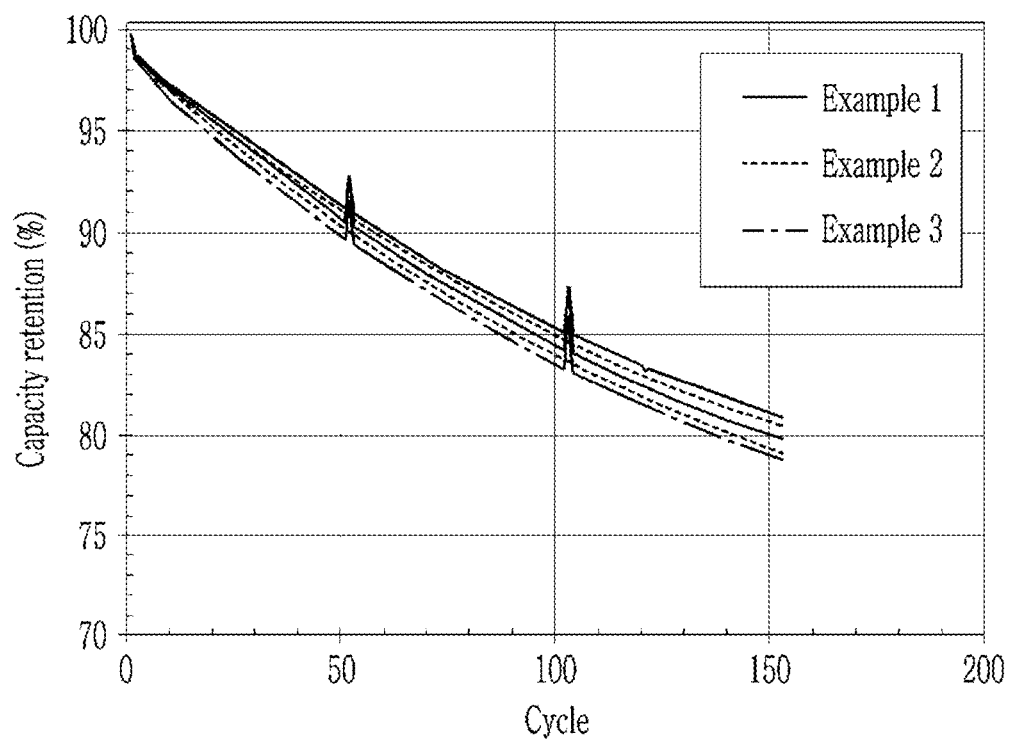
FIG. 7 is a graph showing capacity retention after 150 cycles for rechargeable lithium battery cells according to Examples 1 to 3.

Rechargeable lithium battery cells obtained according to Examples 1 to 3 were charged at a rate of 0.5 C/0.5 C and at 4.4V and then discharged until 3.0V, and the cell capacity decrease rate after 150 cycles was measured. The results thereof are shown in FIG. 7. At 51 cycles and 101 cycles, they were charged at a rate of 0.2 C/0.2 C at 4.4V and then discharged at 3.0V to evaluate a recovered capacity.

FIG. 7 is a graph showing capacity retention for 150 cycles of rechargeable lithium battery cells according to Examples 1 to 3.

Referring to FIG. 7, excellent capacity retention after 150 cycles was exhibited by the battery cells according to Examples 1 to 3.

Resultantly, the rechargeable lithium battery cell according to an embodiment may have effective shut-down functions while maintaining excellent battery characteristics.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Hereinbefore, certain embodiments of the present disclosure have been described and illustrated. It should be apparent to a person having ordinary skill in the art, however, that the subject matter of the present disclosure is not limited to the embodiments as described herein, and may be variously modified and transformed without departing from the spirit and scope of the present disclosure. Accordingly, the modified or transformed embodiments as such may not be understood separately from the technical ideas and aspects of the present disclosure, and the modified embodiments are within the scope of the claims of the present disclosure, and equivalents thereof.

DESCRIPTION OF AT LEAST SOME OF THE SYMBOLS

100: rechargeable lithium battery
112: negative electrode
113: separator
114: positive electrode
120: battery case
140: sealing member
200: coin symmetric cell
210: spring
212: negative electrode
214: positive electrode
216: first spacer
218: separator
220: bottom case
222: second spacer
224: top case

What is claimed is:

1. A rechargeable lithium battery, comprising:
a negative electrode comprising a negative current collector, a negative active material layer on the negative current collector, and a negative functional layer on the negative active material layer; and
a positive electrode comprising a positive electrode current collector and a positive active material layer on the positive electrode current collector,
wherein the negative functional layer comprises flake-shaped polyethylene particles, having a ratio of a major axis length to a minor axis length of 2.4 to 4.5,
and
the positive active material layer comprises a first positive active material comprising one or more composite oxides of lithium and a metal selected from cobalt, manganese, nickel, and a combination thereof, and a second positive active material comprising a compound represented by Chemical Formula 1:

$Li_aFe_{1-x}M_xPO_4$ [Chemical Formula 1]

wherein, in Chemical Formula 1, 0.90≤a≤1.8, 0≤x≤0.7, and M is Mg, Co, Ni, or a combination thereof.

2. The rechargeable lithium battery of claim 1, wherein the flake-shaped polyethylene particles have an average particle size (D50) of 1 μm to 8 μm.

3. The rechargeable lithium battery of claim 1, wherein the flake-shaped polyethylene particles have a thickness of 0.2 μm to 4 μm.

4. The rechargeable lithium battery of claim 1, wherein the negative functional layer further comprises inorganic particles and a binder.

5. The rechargeable lithium battery of claim 4, wherein a weight ratio of the sum of the flake-shaped polyethylene particles and the inorganic particles to the binder is 80:20 to 99:1.

6. The rechargeable lithium battery of claim 4, wherein a weight ratio of the flake-shaped polyethylene particles to the inorganic particles is 95:5 to 10:90.

7. The rechargeable lithium battery of claim 1, wherein the negative functional layer has a thickness of 1 μm to 10 μm.

8. The rechargeable lithium battery of claim 1, wherein a ratio of a thickness of the negative active material layer to a thickness of the negative functional layer is 50:1 to 10:1.

9. The rechargeable lithium battery of claim 1, wherein the first positive active material is included in an amount of 70 wt % to 99 wt % based on a total weight of the positive active material layer.

10. The rechargeable lithium battery of claim 1, wherein the second positive active material is included in an amount of 1 wt % to 15 wt % based on a total weight of the positive active material layer.

11. The rechargeable lithium battery of claim 1, wherein the positive electrode further comprises a positive functional layer on the positive active material layer.

12. The rechargeable lithium battery of claim 11, wherein the first positive active material is included in the positive active material layer and
the second positive active material is included in at least one selected from the positive active material layer and the positive functional layer.

13. The rechargeable lithium battery of claim 1, wherein the second positive active material is LiFePO_4.

* * * * *